UNITED STATES PATENT OFFICE.

CARL LANGER AND OTTO LANGER, OF CLYDACH, WALES.

PROCESS OF REFINING NICKEL-COPPER MATTE.

1,291,030. Specification of Letters Patent. Patented Jan. 14, 1919.

No Drawing. Application filed November 10, 1917. Serial No. 201,380.

*To all whom it may concern:*

Be it known that we, CARL LANGER and OTTO LANGER, both subjects of His Majesty the King of Great Britain and Ireland, residing at Clydach, in the county of Glamorgan, Wales, Great Britain, have invented a new and useful Improved Process of Refining Nickel-Copper Matte, of which the following is a specification.

In most of the wet methods of refining nickel-copper-matte the aim has been to treat the roasted matte with chemicals in such a way, that one of the metals, say the nickel will not be acted upon, while the copper will be brought into solution. As the oxids of the two metals are similar in their chemical behavior when this method is employed although a large percentage of the copper is dissolved still some of the nickel is also with the result that the separation of the two metals is imperfect. Another difficulty experienced is that some chemicals cease to act on the roasted matte after a certain amount of chemical action has taken place. Dilute sulfuric acid, for instance, will dissolve about 70 to 80% of the copper present in the roasted matte, then the reaction ceases; but about 5% of the nickel contained in the matte will also have entered into the solution.

According to this invention when carried out to its fullest extent it is proposed to first treat finely ground roasted nickel matte with dilute sulfuric acid so as to dissolve out the bulk of the copper and then submit the undissolved portion of the matte so as to simultaneously change the oxids contained in nickel copper matte to sulfates by treating the matte with strong sulfuric acid at a temperature of about 150° C. and to subsequently separate the sulfates produced by dissolving them in water and precipitating the copper from the solution by finely divided metallic nickel and recover the nickel from its solution by electrolysis.

It will be found that sulfuric acid of about 140 Tw. will combine readily with the nickel-oxid, copper-oxid and cuprous oxid of a well roasted matte at a temperature of about 150° C. The sulfates thus formed can be dissolved in water and the copper separated from the nickel by precipitation with finely divided metallic nickel.

The entire process may be carried out in the following manner:—

The bessemerized nickel-copper-matte is finely ground so as to pass through a 60 mesh sieve and is then well roasted, and again passed through a mill provided with a 60 mesh screen to break up all lumps formed during the calcination. The matte is then subjected to a treatment with dilute sulfuric acid at about 80° C. so as to dissolve out about 70% of the copper present in the matte. The copper-sulfate solution thus obtained may contain a little nickel but it can be readily converted into marketable coppersulfate, or the copper can be recovered by cementation or other known ways.

The insoluble portion of the matte is separated from the solution by filtration (say on suction filters to remove as much of the solution as possible) and then mixed with a sufficient quantity of ordinary chamber acid to convert the oxids into sulfates, which are heated in cast iron pans to a temperature of about 150° C.

The mixture of matte and acid should be kept well agitated during this operation, as otherwise the heavy matte would settle on the bottom and escape the action of the acid. Toward the end of the reaction the mixture becomes pasty and finally lumpy, when it is removed into tanks containing hot water. The sulfates readily dissolve and leave only a small amount of residue which is collected and retreated with strong acid at 150° C. to remove the copper and nickel which may previously have escaped the action of the acid.

If the matte under treatment contains precious metals they accumulate in the final residue.

The copper may be separated from the nickel contained in the solution by precipitation with finely divided metallic nickel, and this may be obtained by reducing part of the matte, from which the bulk of the copper has been removed, as above described, by means of water-gas, producergas, or other convenient reducing agent, to the metallic state. The precipitation of the copper is carried out in vessels provided with agitators which keep the metallic powder in suspension during the treatment and steam jets to keep the temperature of the solution at about 80° C. The metallic powder is gradually introduced until all the copper has been removed from the solution. The resulting nickel-sulfate solution is filtered off and can be crystallized to nickel-sulfate or the nickel can be recovered as metal by electrolysis.

The precipitated copper can either be reconverted into oxid by calcination and redissolved in dilute sulfuric acid to make a further quantity of copper-sulfate, or it can be refined to metallic copper by casting it into anodes and subjecting them to electrolysis. In both cases the precious metal contained in the reduced matte will be found in the final residues.

What we claim is:—

The process of treating roasted nickel-copper matte which consists in first dissolving out the bulk of the copper oxid by means of dilute sulfuric acid, then treating the residue with strong sulfuric acid at a temperature of about 150° C. so as to convert the oxids into sulfates, then dissolving the sulfates in water and precipitating the copper by means of finely divided metallic nickel.

In witness whereof we have hereunto set our hands.

CARL LANGER.
OTTO LANGER.